July 22, 1952
C. F. BACHLE
2,604,298
TURBINE WHEEL AND MEANS FOR COOLING SAME
Filed Sept. 28, 1946
3 Sheets-Sheet 1
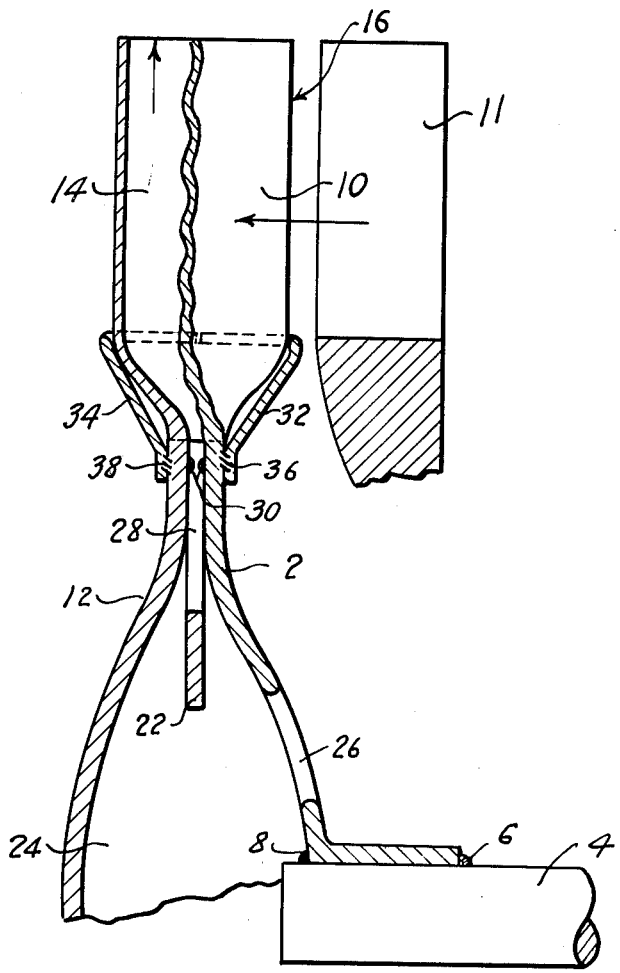
INVENTOR.
Carl F. Bachle
BY Hauke & Hardesty
ATTORNEYS July 22, 1952        C. F. BACHLE        2,604,298

TURBINE WHEEL AND MEANS FOR COOLING SAME

Filed Sept. 28, 1946        3 Sheets-Sheet 2

INVENTOR.
Carl F. Bachle
BY Hauke & Hardesty
ATTORNEYS

Patented July 22, 1952

2,604,298

UNITED STATES PATENT OFFICE 2,604,298

TURBINE WHEEL AND MEANS FOR COOLING SAME

Carl F. Bachle, Detroit, Mich., assignor to Continental Aviation & Engineering Corporation, Detroit, Mich., a corporation of Virginia Application September 28, 1946, Serial No. 699,989

2 Claims. (Cl. 253—39.15)

This invention relates to turbines, particularly to the turbine wheel and bucket assembly of a gas turbine engine, and to a method of making the same.

Until recently, gas turbines were not commercially feasible, and one reason was that the materials used were unable to withstand sufficiently high temperatures to permit operation at an economical and competitive efficiency. Gas turbines have recently become competitive for a number of reasons, among which is the development of metal alloys which are capable of operating for long periods at high temperatures.

The solution is not limited, however, to the development of such alloys. Another method of solving the problem is to cool the parts which are subjected to high temperatures. A cooled turbine "bucket" is bound to be capable of operating with higher fluid temperatures than an uncooled one regardless of alloy developments, because of course the cooled bucket may also be made of the alloy.

It is the object of this invention to provide a turbine wheel and bucket assembly and method of making the assembly. This object is achieved by making the wheel and buckets in two parts which fit together to form a passage through the wheel and buckets for cooling air.

In the drawings:

Fig. 1 is a longitudinal section through a turbine wheel and nozzle made according to the invention.

A dish-like disc 2 is mounted for rotation on shaft 4. Disc 2 may be secured to the shaft by means of welding as shown at 6 and 8 or the disc may be secured to a hub by bolts or a weld and the hub mounted on the shaft, or any other suitable mounting means may be used. Disc 2 has a plurality of peripheral projections 10 which are designed to form the front faces, or the faces on which the energy fluid from nozzles 11 impinges, of turbine buckets or blades.

Figure 2:
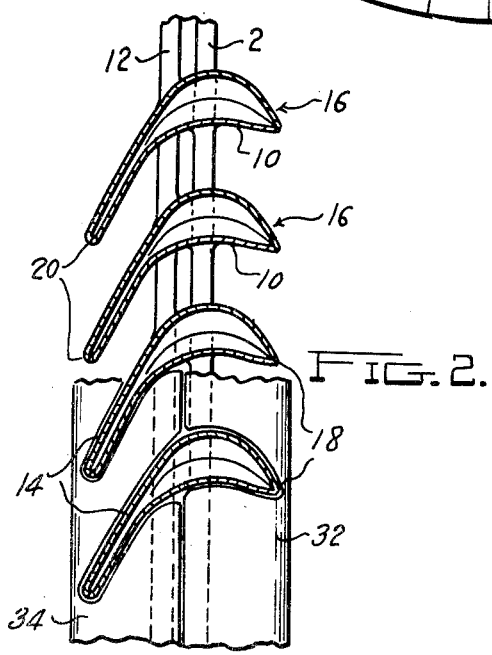
Fig. 2 is a developed plan view of the periphery of the turbine wheel.

A second disc 12 similar in shape is provided with peripheral projections 14 which are designed to cooperate with projections 10 to form the complete turbine buckets 16. As is best seen in Fig. 2, the entire front face of a bucket is integral with one of the discs and the entire back of the bucket is integral with the other disc, the two halves fitting together at 18 and 20.

Figure 6:
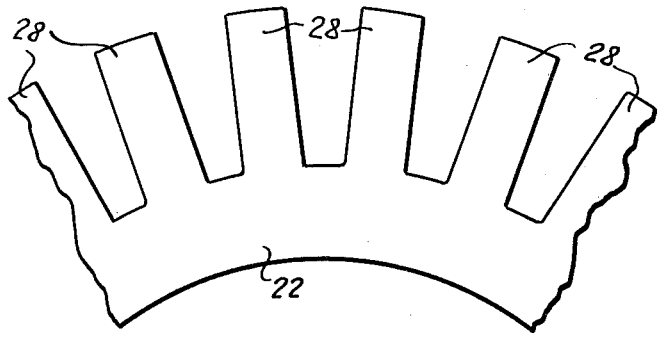
Fig. 6 is a detail view of the spacer disc.

A spaced disc 22 is shown disposed between the discs 2 and 12 to provide air passages between the discs from the space 24, defined by the central portions of the discs, radially outward to the buckets 16. Cooling air enters the space 24 through one or more openings 26 in disc 2. As can be seen in Fig. 6, the spacer disc 22 is provided at its periphery with fingers 28 which are spaced apart a distance equal to the circumferential spacing between the turbine buckets. Spacer disc 22 is disposed between discs 2 and 12 in such a way that the fingers 28 lie directly opposite the space between adjacent buckets. The discs 2, 22 and 12 are preferably held together by means of spot welding the discs 2 and 12 to the fingers 28 as indicated at 30. A two-part shroud ring consisting of the halves 32 and 34 is provided, the two halves being secured to the discs 2 and 12, preferably by welding as indicated at 36 and 38.

Figure 3:
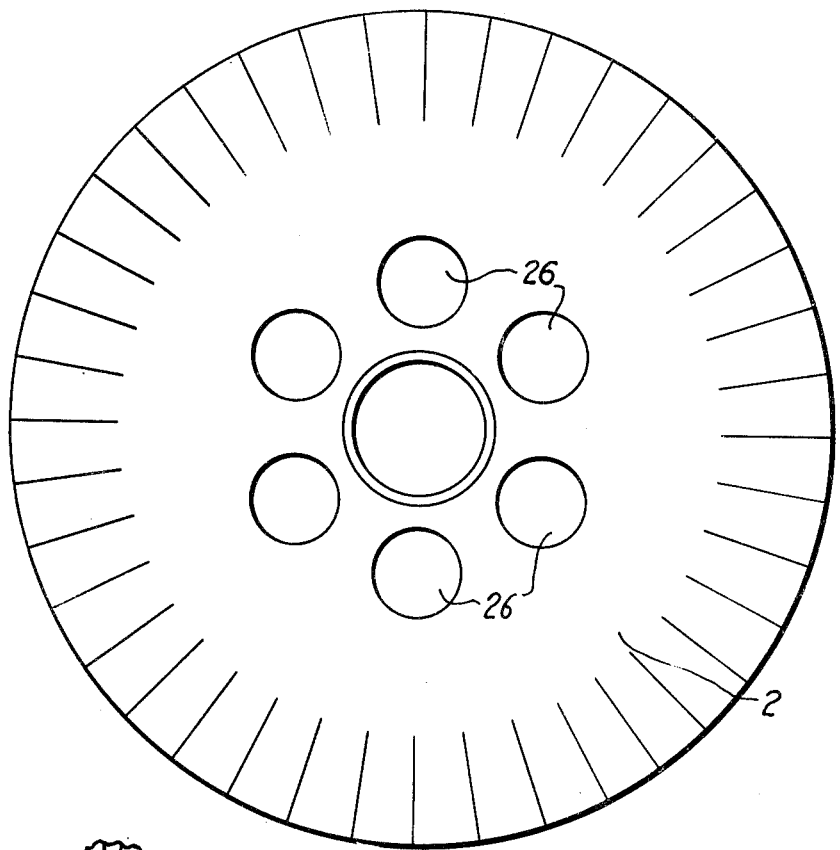
Fig. 3 is a view in elevation of one of the discs at one stage of fabrication.
Figure 4:
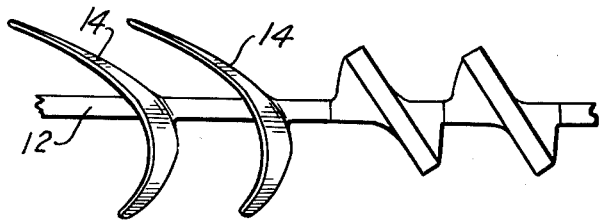
Fig. 4 is a developed view of one of the discs showing the projections before and after forging.
Figure 5:
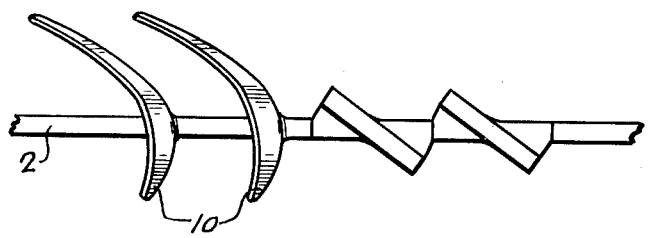
Fig. 5 is a developed edge view of the other disc showing the projections before and after forging.

In the manufacture of a turbine wheel according to this invention, the discs may be slit radially inward as indicated on the disc 2 in Fig. 3. The metal between the slits may then be twisted to an angle something less than 90° with the edge of the disc, depending upon the final angle of the turbine bucket, as shown in Figs. 4 and 5, after which the twisted projections may be forged to form the bucket halves 10 and 14. The two discs are then fitted together and welded as shown at 30, and the shroud ring is secured thereto as indicated above.

I claim:

1. A turbine rotor comprising a pair of complementary discs each provided with depressed dish-like central portions and peripheral projections providing half turbine buckets, an intermediate spacer member comprising a ring having a plurality of annularly spaced extensions projecting radially outwardly from the periphery of the ring and concentrically disposed with respect to said discs to radially align the spaces between said extensions with the buckets, and means joining said discs to the extensions of said spacer ring and providing communicating passages between the discs and through the buckets for circulation of a coolant fluid therethrough.

2. A turbine rotor comprising a pair of complementary discs each provided with depressed dish-like central portions and peripheral projections providing half turbine buckets, an intermediate spacer member comprising a ring having a plurality of annularly spaced extensions projecting radially outwardly from the periphery of the ring and concentrically disposed with respect to said discs to radially align the spaces between said extensions with the buckets, and means joining said discs to the extensions of said spacer ring and providing communicating passages between the discs and through the buckets for circulation of a coolant fluid therethrough, said turbine buckets halves constructed and arranged to form hollow turbine blades open at their peripheral tips, and one of said discs having at least one opening in said dish-like central portion for the admission of a coolant fluid for conduction through said passages to the open peripheral tips of said buckets.

CARL F. BACHLE.

REFERENCES CITED

The following references are of record in the file of this patent:

UNITED STATES PATENTS

| Number | Name | Date |
| --- | --- | --- |
| 1,142,690 | Francke | June 8, 1915 |
| 1,325,208 | Rice | Dec. 16, 1919 |
| 2,241,782 | Jendrassik | May 13, 1941 |
| 2,405,190 | Darling | Aug. 6, 1946 |

FOREIGN PATENTS

| Number | Country | Date |
| --- | --- | --- |
| 319,622 | Great Britain | Dec. 18, 1930 |
| 523,038 | Great Britain | July 3, 1940 |
| 369,996 | Germany | Feb. 26, 1923 |